(12) United States Patent
Anderson

(10) Patent No.: US 7,412,252 B2
(45) Date of Patent: Aug. 12, 2008

(54) SYSTEM, TRANSMITTER, RECEIVER AND METHOD FOR COMMUNICATION POWER CONTROL

(75) Inventor: Nicholas William Anderson, Bath (GB)

(73) Assignee: IPWireless, Inc., San Bruno, CA (US)

( * ) Notice: Subject to any disclaimer, the term of this patent is extended or adjusted under 35 U.S.C. 154(b) by 589 days.

(21) Appl. No.: 10/439,250

(22) Filed: May 15, 2003

(65) Prior Publication Data

US 2004/0077368 A1    Apr. 22, 2004

(30) Foreign Application Priority Data

May 15, 2002    (GB)    .................... 0211005.4

(51) Int. Cl.
*H04B 7/00* (2006.01)
(52) U.S. Cl. .................... 455/522; 455/69; 455/13.4
(58) Field of Classification Search ............... 455/522, 455/69, 442, 517, 507, 68, 436; 370/342, 370/335, 318, 337, 331, 310
See application file for complete search history.

(56) References Cited

U.S. PATENT DOCUMENTS

| 5,754,947 | A * | 5/1998 | Tanabe et al. ............... 455/515 |
| 5,909,434 | A * | 6/1999 | Odenwalder et al. ........ 370/342 |
| 6,058,107 | A | 5/2000 | Love et al. |
| 6,263,030 | B1 * | 7/2001 | Khayrallah .................. 375/341 |
| 6,285,886 | B1 * | 9/2001 | Kamel et al. ................. 455/522 |
| 6,512,931 | B1 * | 1/2003 | Kim et al. .................... 455/522 |

(Continued)

FOREIGN PATENT DOCUMENTS

EP    0089831 A2    9/1983

(Continued)

OTHER PUBLICATIONS

Lucent Technologies, Inc. (2000). "Downlink and Uplink Structures for HSDPA," TSG-RAN WG1, Stockholm, Sweden, Nov. 21-24, 2000, pp. 1-7.

(Continued)

*Primary Examiner*—Tan Trinh
(74) *Attorney, Agent, or Firm*—Morrison & Foerster LLP

(57) ABSTRACT

A system, transmitter, receiver and method for communication power control by the transmitting entity (150A) keeping a sequence number counter (200) per UE (130A) that is incremented whenever a common channel transmission is made specifically to that UE, the value of the counter is signalled inside the message itself (or possibly by other signalling means) across the Uu interface, when the intended recipient UE correctly decodes a message, it also decodes the counter value, it compares this counter value with the last correctly received sequence number, which it holds in a memory (300), and deduces whether there are any missing sequence numbers, and accordingly effects transmission power control, this provides the advantage that the transmitting entity is able to provide information to the receiving entity that enables a correct recipient-specific error statistic to be generated, when applied to 3GPP release 5 HS-SCCH for TDD, this technique is able to assist the UE in calculating a correct error statistic for the HS-SCCH enabling the UE then to correctly set the SIR target to meet the desired HS-SCCH error target, and to then consequently correctly set the TPC command direction as "power-up" or "power-down".

48 Claims, 2 Drawing Sheets

U.S. PATENT DOCUMENTS

Figure 1:
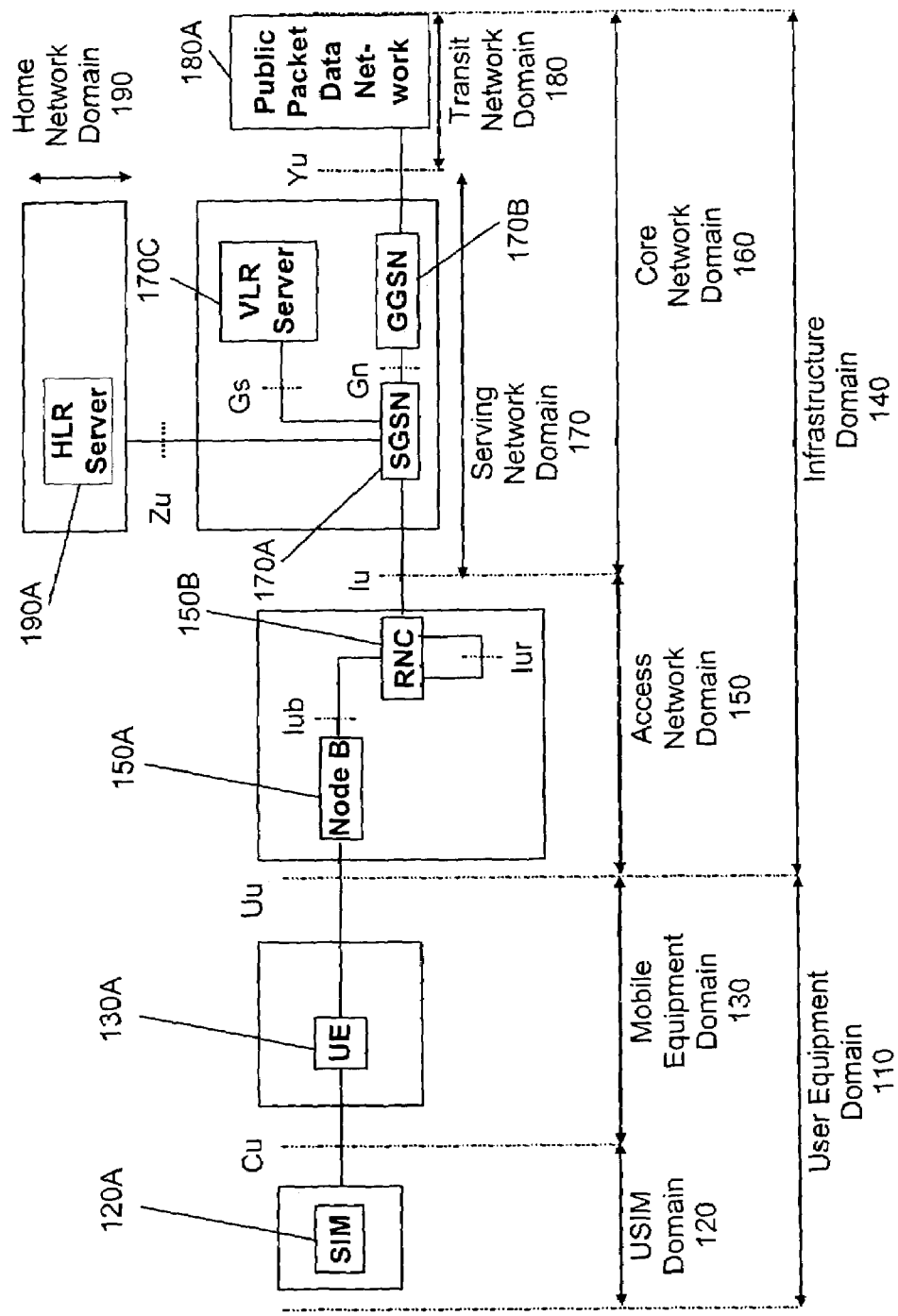

| | | | |
|---|---|---|---|
| 6,519,236 B1* | 2/2003 | Haartsen et al. | 370/332 |
| 6,603,752 B1* | 8/2003 | Saifuddin et al. | 370/335 |
| 6,865,169 B1 | 3/2005 | Quayle et al. | |
| 6,931,256 B2* | 8/2005 | Mandyam | 455/522 |
| 7,027,829 B1* | 4/2006 | Laakso et al. | 455/522 |
| 2002/0115462 A1* | 8/2002 | Hottinen | 455/522 |
| 2003/0016641 A1* | 1/2003 | Terry et al. | 370/335 |
| 2003/0045318 A1* | 3/2003 | Subrahmanya | 455/522 |
| 2003/0054773 A1* | 3/2003 | Vanghi | 455/70 |
| 2005/0117553 A1* | 6/2005 | Wang et al. | 370/338 |

FOREIGN PATENT DOCUMENTS

| | | |
|---|---|---|
| EP | 0414385 A2 | 2/1991 |
| EP | 0548939 | 6/1993 |
| EP | 1168657 A2 | 1/2002 |
| GB | 2330737 A | 4/1999 |
| JP | 2000252917 | 9/2000 |
| WO | WO-9943181 | 8/1999 |
| WO | WO-00/18033 A1 | 3/2000 |
| WO | WO-01/22762 A1 | 3/2001 |
| WO | WO-0201789 | 1/2002 |

OTHER PUBLICATIONS

International Search Report mailed on Aug. 29, 2003, for PCT Application No. PCT/GB03/02119, filed on May 15, 2003, 3 pages.

EP Examination Report dated Jun. 5, 2007, for EP Application No. 03722873.1, 3 pages.

"3rd Generation Partnership Project; Technical Specification Group Radio Access Network; Physical Layer Procedures (TDD) (Release 5)," (Mar. 2003). 3GPP:Valbonne, France, TS 25.224 v5.4.0:1-46.

"3rd Generation Partnership Project; Technical Specification Group Radio Access Network; Multiplexing and Channel Coding (TDD) (Release 5)," (Mar. 2003). 3GPP:Valbonne, France, TS 25.222 v5.4. 0:1-66.

Great Britain Search Report mailed Jun. 23, 2003, for GB Application No. 0211005.4, 2 pages.

IPWireless. (Apr. 9-12, 2002). "Options for Power Control of HS-SCCH for TDD Release 5," 3GPP TSG-RAN WG1#25, Tdoc R1-02-0633, Paris, France, 3 pages.

IPWireless. (Feb. 18-22, 2002). "Power Control for HS-SCCH for TDD Release 5," 3GPP TSG-RAN WG1#24, T-doc R1-02-0409, Orlando, Florida, 5 pages.

LG Electronics Inc.. (Apr. 9-12, 2002). "Considerations on HS-SCCH Power Control," TSG-RAN Working Group 1 Meeting #25, R1-02-0559, Paris, France, 4 pages.

Siemens. (Feb. 18-22, 2002). "Power Control for HS-SCCH and HS-SICH in TDD," 3GPP TSG-RAN WG1#24, Tdoc R1-02-0293, Orlando, Florida, 4 pages.

* cited by examiner

SYSTEM, TRANSMITTER, RECEIVER AND METHOD FOR COMMUNICATION POWER CONTROL

FIELD OF THE INVENTION

This invention relates to communication systems, and particularly though not exclusively to power control in mobile communication systems employing common channels, e.g., HS-SCCHs (High-Speed Shared Control Channels).

BACKGROUND OF THE INVENTION

In the field of this invention it is known that many communications systems employ common channels. These channels are used to send information from a single transmitting point to specific desired receiving points. In general, when using common channels, all receiving points are "listening" for a transmission that is intended for them. A specific receiver to which a given transmission is sent is normally identified via an "address" or ID field within the common transmission. Each receiver uses this address to identify whether or not the transmission was intended for it. If not, the transmission is discarded. If the address field matches that of a given receiver, the receiver will attempt to fully decode the sent information.

An example of such a common channel implementation is the HS-SCCH (High-Speed Shared Control Channel) as specified by 3GPP (3rd Generation Partnership Project) release 5.

A problem exists within the current release 5 specifications for 3GPP TDD (Time Division Duplex) mode, whereby a Transmit Power Control (TPC) based power control scheme is used to control the transmit power of the HS-SCCH. User equipment (UE) is capable of measuring the signal to interference ratio SIR of HS-SCCHs that were correctly decoded by the UE (and hence intended for that UE). The UE then compares the measured SIR with a nominal target SIR and generates binary TPC commands that indicate to the transmitter whether the power should be increased or decreased. The nominal SIR target is set based upon the target error rate. For low target error rates, a high SIR target will be set, and vice versa. Also, the SIR target required to attain a target error rate will vary with the radio channel propagation conditions. Parameters that affect this "SIR-to-error-rate" mapping are, for example, UE speed and the amount of multipath (reflections) in the channel. It is therefore the job of the UE (in the TPC-based power control scheme) to autonomously adapt the SIR target in response to a measured error rate, or error statistics. Without correct error statistics, the UE is unaware of how well it is doing in controlling transmit power and the target error rate may not necessarily be met.

However, this approach has the disadvantage(s) that in the TPC scheme for the HS-SCCH common channel the UE is unable to distinguish between a transmission not intended for it (the decode will fail) and a transmission that was intended for it but was corrupted by noise and/or interference. This inability to detect how many messages were actually transmitted to the UE is a problem since the UE is therefore unable to determine the actual error rate (the UE knows how many overall messages were in error, across all UEs, but does not know how many were sent to it, nor how many of those sent to it were in error). As such, the TPC based power control scheme for the HS-SCCH common channel cannot be made to operate correctly, or at least it will be very difficult for the UE to reach the correct error rate.

A need therefore exists for system, transmitter, receiver and method for communication power control wherein the abovementioned disadvantage(s) may be alleviated.

STATEMENT OF INVENTION

In accordance with a first aspect of the present invention there is provided a communication system having communication power control, the system comprising:
at a transmitter,
   means for holding a value representative of the number of transmissions intended for a predetermined receiver, and
   means for communicating the transmitter holding means value; and
at a receiver,
   means for holding the transmitter holding means value associated with the last transmission successfully decoded at the receiver, and
   means for comparing the communicated transmitter holding means value with the receiver holding means value and in dependence thereon effecting transmission power control.

In accordance with a second aspect of the present invention there is provided a transmitter for use in a communication system having communication power control, the transmitter comprising:
   means for holding a value representative of the number of transmissions intended for a predetermined receiver, and
   means for communicating the transmitter holding means value.

In accordance with a third aspect of the present invention there is provided a receiver for use in a communication system having communication power control, the receiver comprising:
   means for holding a value associated with the last transmission successfully decoded at the receiver,
   means for receiving a communicated value associated with a transmission, and
   means for comparing the communicated value with the receiver holding means value and in dependence thereon effecting transmission power control.

In accordance with a fourth aspect of the present invention there is provided a method for power control in a communication system, the method comprising:
providing at a transmitter,
   means holding a value representative of the number of transmissions intended for a predetermined receiver, and
   means communicating the transmitter holding means value; and
providing at a receiver,
   means holding the transmitter holding means value associated with the last transmission successfully decoded at the receiver, and
   means comparing the communicated transmitter holding means value with the receiver holding means value and in dependence thereon effecting transmission power control.

BRIEF DESCRIPTION OF THE DRAWING(S)

Figure 2:
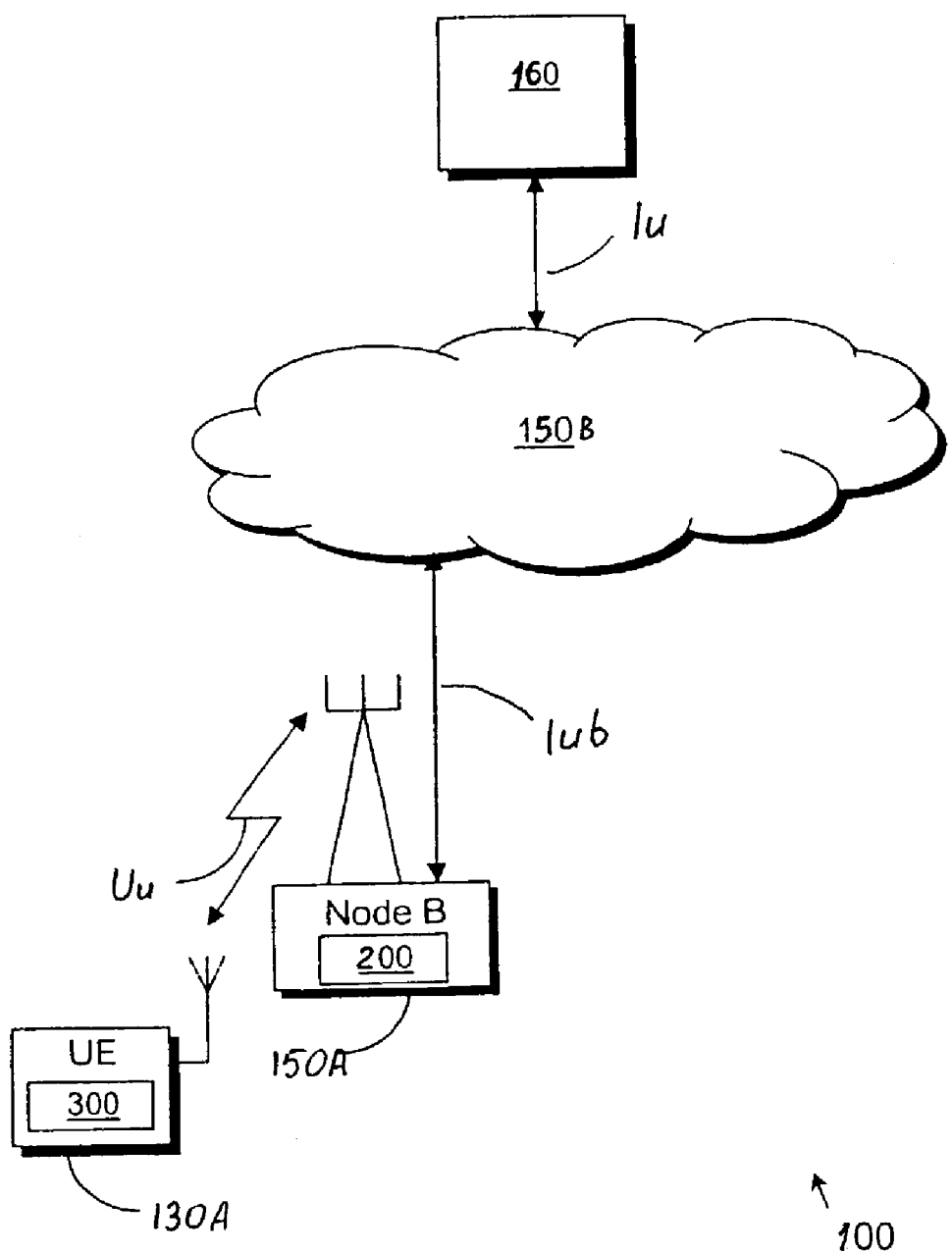

One system, transmitter, receiver and method for communication power control incorporating the present invention will now be described, by way of example only, with reference to the accompanying drawing(s), in which:

FIG. 1 shows a block diagrammatic representation of a UTRA TDD system, employing HS-SCCH common channel, in which the present invention is used; and FIG. 2 shows a block-schematic diagram showing a UE and a Node B of the UTRA TDD system of FIG. 1.

DESCRIPTION OF PREFERRED EMBODIMENT

Referring firstly to FIG. 1, a typical, standard UMTS network (100) is conveniently considered as comprising: a user equipment domain (110), made up of a user SIM (USIM) domain (120) and a mobile equipment domain (130); and an infrastructure domain (140), made up of an access network domain (150), and a core network domain (160), which is in turn made up of a serving network domain (170) and a transit network domain (180) and a home network domain (190).

In the mobile equipment domain (130), user equipment UE (130A) receives data from a user SIM (120A) in the USIM domain 120 via the wired Cu interface. The UE (130A) communicates data with a Node B (150A) in the network access domain (150) via the wireless Uu interface. Within the network access domain (150), the Node B (150A) communicates with a radio network controller or RNC (150B) via the Iub interface. The RNC (150B) commmunicates with other RNC's (not shown) via the Iur interface. The RNC (150B) communicates with a SGSN (170A) in the serving network domain (170) via the Iu interface. Within the serving network domain (170), the SGSN (170A) communicates with a GGSN (170B) via the Gn interface, and the SGSN (170A) communicates with a VLR server (170C) via the Gs interface. The SGSN (170A) communicates with an HLR server (190A) in the home network domain (190) via the Zu interface. The GGSN (170B) communicates with public data network (180A) in the transit network domain (180) via the Yu interface.

Thus, the elements RNC (150B), SGSN (170A) and GGSN (170B) are conventionally provided as discrete and separate units (on their own respective software/hardware platforms) divided across the access network domain (150) and the serving network domain (170), as shown the FIG. 1.

The RNC (150B) is the UTRAN element responsible for the control and allocation of resources for numerous Node B's (150A); typically 50 to 100 Node B's may be controlled by one RNC. The RNC also provides reliable delivery of user traffic over the air interfaces. RNC's communicate with each other (via the interface Iur) to support handover and macrodiversity.

The SGSN (170A) is the UMTS Core Network element responsible for Session Control and interface to the Location Registers (HLR and VLR). The SGSN is a large centralised controller for many RNCs.

The GGSN (170B) is the UMTS Core Network element responsible for concentrating and tunnelling user data within the core packet network to the ultimate destination (e.g., internet service provider—ISP).

The UTRA TDD system (100) employs common channels. These channels are used to send information from a single transmitting point (Node B—150A) to specific desired receiving points (UEs—130A). In general, when using common channels, all receiving points are "listening" for a transmission that is intended for them. A specific receiver to which a given transmission is sent is normally identified via an "address" or ID field within the common transmission. Each receiver uses this address to identify whether or not the transmission was intended for it. If not, the transmission is discarded. If the address field matches that of a given receiver, the receiver will attempt to fully decode the sent information.

An example of such a common channel implementation is the HS-SCCH (High-Speed Shared Control Channel) as specified by 3GPP (3rd Generation Partnership Project) release 5—available at the website www.3gpp.com. Release 5 is applicable to both FDD and TDD. The following example is described in the context of TDD; however, although there are other methods of performing power control of HS-SCCH in FDD, it is possible that HS-SCCH in FDD may alternatively use other power control techniques and therefore it should be understood that the present invention may be applied to both TDD and FDD.

A problem exists within the current release 5 specifications for 3GPP TDD (Time Division Duplex) mode, whereby a Transmit Power Control (TPC) based power control scheme is used to control the transmit power of the HS-SCCH. User equipment (UE—130A) is capable of measuring the signal to interference ratio SIR of HS-SCCHs that were correctly decoded by the UE (and hence intended for that UE). The UE then compares the measured SIR with a nominal target SIR and generates binary TPC commands that indicate to the transmitter whether the power should be increased or decreased. The nominal SIR target is set based upon the target error rate. For low target error rates, a high SIR target will be set, and vice versa. Also, the SIR target required to attain a target error rate will vary with the radio channel propagation conditions. Parameters that affect this "SIR-to-error-rate" mapping are, for example, UE speed and the amount of multipath (reflections) in the channel. It is therefore the job of the UE (in the TPC-based power control scheme) to autonomously adapt the SIR target in response to a measured error rate, or error statistics. Without correct error statistics, the UE is unaware of how well it is doing in controlling transmit power and the target error rate may not necessarily be met.

However, this approach has the disadvantage(s) that in the TPC scheme for the HS-SCCH common channel the UE is unable to distinguish between a transmission not intended for it (the decode will fail) and a transmission that was intended for it but was corrupted by noise and/or interference. This inability to detect how many messages were actually transmitted to the UE is a problem since the UE is therefore unable to determine the actual error rate (the UE knows how many overall messages were in error, across all UEs, but does not know how many were sent to it, nor how many of those sent to it were in error). As such, the TPC based power control scheme for the HS-SCCH common channel cannot be made to operate correctly, or at least it will be very difficult for the UE to reach the correct error rate.

Referring now also to FIG. 2, the system 100 employs a scheme that may be used to help the UE make far more accurate error rate measurements on the common channel (HS-SCCH).

The scheme is very simple and operates as follows: The transmitting entity (in this case the Node B—150A) keeps a sequence number counter (only one of which, 200, is shown) per UE that is incremented whenever a common channel transmission is made specifically to that UE. The counter need not be of infinite length, and a cyclic counter of finite length may be used. The length of the counter used (before a counter wrap-around occurs) is a function of how many consecutive errors it is wished to detect between successive successful decodings of the common channel by the UE. That is to say that for high error rates, it may be desired to detect say 20 consecutive errors, so the counter must be of length 20, but for low error rates, the error event is seldom encountered and so the likelihood of several consecutive error events is low, and so a counter of smaller length may be used.

Other factors should also be considered as to the nature of the error events (e.g., do they occur in clumps or are they all statistically independent).

Whenever a common channel message is sent to a particular recipient (UE—130A), the counter (200) for that recipient is incremented. The value of the counter is signalled inside the message itself (or possibly by other signalling means) across the Uu interface. When the intended recipient UE correctly decodes a message, it also decodes the counter value or sequence number. It compares this counter value or sequence number with the last correctly received sequence number, which it holds in a memory 300, and (if there is a difference of more than 1) deduces whether there are any missing sequence numbers. If there are missing sequence numbers, it can deduce how many were missed and also how many in total were sent to the recipient since the last correctly decoded message. By performing this measurement technique between each successfully decoded pair of messages the recipient is able to generate a complete and accurate picture of the error statistics for the transmissions sent to it (importantly whilst being able to disregard transmissions intended for others).

Thus, the scheme allows the transmitting entity to be able to provide information to the receiving entity that enables a correct recipient-specific error statistic to be generated. When applied to 3GPP release 5 HS-SCCH for TDD, this technique is able to assist the UE in calculating a correct error statistic for the HS-SCCH, enabling the UE then to correctly set the SIR target to meet the desired HS-SCCH error target, and then consequently to correctly set the TPC command direction as "power-up" or "power-down". The (binary) TPC commands are sent to the transmitting entity (the Node B) on uplink transmissions (in this specific case on the HS-SICH—the High-Speed Shared Information CHannel).

Although sequence numbers are already used extensively already within 3GPP and many other communication systems in order to identify the ordering of sequences of packets), heretofore they have typically been used to enable the following:

1) correct re-ordering of the packets in the event that they are received out of order with respect to the transmitted ordering
2) identification of missing packets to enable an automatic repeat request scheme, requesting a re-send of the missing information
3) integrity protection of packets.

However, there has been no disclosure nor suggestion that sequence numbering could be used in respect of common channel transmissions to enable improved error rate monitoring at the receiver for the purposes of improved TPC-based (binary-feedback—or other type of feedback) power control.

It will be appreciated that the method described above for improved error rate monitoring at the receiver for the purposes of improved TPC-based power control may be carried out in software running on a processor (not shown) in the Node B and on a processor (not shown) in the UE, and that the software may be provided as a computer program element carried on any suitable data carrier (also not shown) such as a magnetic or optical computer disc.

It will be also be appreciated that the method described above for improved error rate monitoring at the receiver for the purposes of improved TPC-based power control may alternatively be carried out in hardware, for example in the form of an integrated circuit (not shown) such as an FPGA (Field Programmable Gate Array) or ASIC (Application Specific Integrated Integrated Circuit).

It will be understood that the system, transmitter, receiver and method for communication power control described above provides the following advantages: the transmitting entity is able to provide information to the receiving entity that enables a correct recipient-specific error statistic to be generated. When applied to 3GPP release 5 HS-SCCH for TDD, this technique is able to assist the UE in calculating a correct error statistic for the HS-SCCH enabling the UE then to correctly set the SIR target to meet the desired HS-SCCH error target, and then consequently to correctly set the TPC command direction as "power-up" or "power-down".

APPENDIX

This Appendix Contains a Proposed Presentation to a 3GPP Meeting for Incoporation of an Implmentation of the Present Invention into the 3GPP Standard Sequence Numbering for HS-SCCH Power Control in TDD

1 BACKGROUND

Accurate power control of HS-SCCH is essential in providing high system capacity in release 5.

For FDD, there are two methods available to the node-B in order to perform power control of the HS-SCCH [1]. These are:

1. HS-SCCH power is adjusted in response to the TPC commands received on UL DPCCH as pertinent to the DL DPCH. An offset adjustment is required to compensate for the coding differences between DL DPCH and HS-SCCH.
2. HS-SCCH power is inferred from the CQI metrics reported on DPCCH-HS. Again, an adjustment factor is required in order to correct for the differences in processing gain and $E_b/N_0$ between the recommended TFRC for HS-DSCH and the HS-SCCH.

Additionally, combinations of the above two schemes may be used.

For TDD, neither of these schemes can be used directly due the fact that there may be significant differences in the interference seen at the UE on each of the timeslots used for DL DPCH, HS-PDSCH and HS-SCCH. It can be concluded therefore that an alternative approach is required for HS-SCCH power control in TDD.

At present this alternative approach within the release 5 specifications for TDD is a scheme in which a separate stream of TPC commands specific to HS-SCCH power control is transmitted by the UE on HS-SICH [2]. However, as described in [3][4], there are problems associated with this scheme. The target quality for HS-SCCH cannot be guaranteed to be met for all circumstances due to the following:

1. The outer-loop component generating the SIR target value for the inner loop is located within the UE, yet the UE is unable to provide a reliable estimate of HS-SCCH BLER since it is unable to distinguish between an HS-SCCH intended for it that was received in error, and an HS-SCCH transmitted to another UE.
2. The outer-loop algorithm described for the UE [2], is applicable only for cases in which allocation of HS-SCCH is made to the UE in every TTI. This was noted in [5]. For all other cases the loop will over-estimate the BLER and will thus not function correctly.

As such, the current situation in release 5 for TDD is:

the specified scheme is unable to attain the target quality for HS-SCCH under typical operating conditions. This also carries WG4 testing implications.

moreover, alternative HS-SCCH power control schemes such as using DPCH TPC commands and/or CQI information (cf: FDD) cannot be applied by the node-B due to the timeslot-dependent nature of the interference seen at the UE.

system capacity will suffer for TDD as a result of poor power control performance on HS-SCCH It is clear therefore that solutions are required, and several of these have been proposed in previous companion papers [3][4]. In response to [4] at the last WG 1 meeting #25 in Paris, it was suggested that a detailed proposal be submitted to the next meeting. Since then a new improved and simpler scheme has been devised which it is felt circumvents all the above issues and which it is felt represents the most promising way forward.

This paper provides a detailed description of this scheme and appropriate draft CR's to the release 5 specifications are presented.

2 PROPOSED SCHEME

As indicated in section 1, the fundamental problem with a TPC-based HS-SCCH power control scheme is that the outer-loop must reside in the UE, yet the UE is unable to make an estimate of the HS-SCCH message error rate of sufficient accuracy for power control purposes.

The proposal is to circumvent this problem by employing a simple cyclic sequence number in the node-B for each UE that is incremented each time a new HS-SCCH is transmitted to that UE. The cyclic sequence number for the UE is signalled within the HS-SCCH itself in a field termed the HS-SCCH Cyclic Sequence Number (HCSN) field.

Upon each successful HS-SCCH decode the UE increments a similar counter termed the local HCSN ($HCSN_{local}$). By comparing $HCSN_{local}$ to the decoded HSCN, the UE is able to accurately determine the HS-SCCH message error rate. Following this comparison, $HCSN_{local}$ is overwritten with the decoded HCSN.

2.1 Number of HSCN Bits

The number of bits required for HCSN ($N_{HCSN}$) need only be small since the target message error rate for the HS-SCCH is low (approximately 1%). As such a cyclic counter length of only 4 (2 bits) is suggested. For statistically independent HS-SCCH errors the probability of counter wrap-around before the next HS-SCCH is correctly decoded by the UE is then $10^{-8}$. However, of course the HS-SCCH errors are not statistically independent in a fading channel where the HS-SCCH message transmission interval is of comparable length to the coherence time of the channel. In the case that HCSN wrap-around error does occur, the UE will make an incorrect deduction of the HS-SCCH error rate for that interval time between successive decoding of successful HS-SCCH. In this scenario however, the probability that the UE will not detect that one or more error events have occurred is 0.25 (this occurs when the number of errors is an integer multiple of the counter length 4). In the event that an error is detected (75% chance if wrap-around has occurred), then the measured error rate for that interval will necessarily be from the set {25% 50% 75%}. It can be clearly seen that all of these are far higher than the typical target BLER for HS-SCCH and so in any case, even if the measured error rate is slightly incorrect, correct action will still be taken by the outer-loop (ie: the target SIR will be increased).

$N_{HCSN}$=2 is therefore proposed.

2.2 Power Overhead for HCSN Signalling

The new HCSN bits will require an increase in the transmit power for HS-SCCH.

The current HS-SCCH payload information is 27 bits for 1.28 Mcps and is 38 bits for 3.84 Mcps [6]. However, a 16 bit CRC is also added in addition to the 8 tail bits required for the ⅓ rate convolutional encoder. This results in 51 bits input to the convolutional encoder for 1.28 Mcps TDD and 62 bits for 3.84 Mcps TDD. Assuming negligible loss in coding gain for HS-SCCH as a result of the slightly higher code rate, the increase in power for the HS-SCCH resulting from the addition of the 2 HCSN bits is:

1.28 Mcps

Power Increase=$10 \times log_{10}$ (53/51)=0.17 dB 3.84 Mcps

Power Increase=$10 \times log_{10}$ (64/62)=0.14 dB

As is evident the increase in required power is very small. This small penalty is in any case greatly outweighed by the advantages to HS-SCCH capacity afforded by proper and accurate power control of HS-SCCH.

2.3 HS-SCCH Error Calculation in UE

The UE may estimate the number of missed or incorrectly-decoded HS-SCCH that were intended for it between successful HS-SCCH simply as:

$E_\Delta = (HCSN - HCSN_{local} - 1) \bmod 2^{N-HCSN}$

The number of HS-SCCH transmitted to the UE between successful HS-SCCH ($N_\Delta$) may also be estimated by the UE simply as:

$N_\Delta = 1 + E_\Delta$

Therefore the HS-SCCH error rate may be continually assessed and used to update the outer power control loop using the derived $E_\Delta$ and $N_\Delta$.

2.4 Coding and Multiplexing of the CCI Field on HS-SCCH

It is proposed to add the HCSN field to the end of the existing HS-SCCH multiplexed fields prior to CRC concatenation. As is the current situation, generic release 99 rate matching as specified in subclause 4.2.7 of [6] is used to match the convolutional encoder output bits to the HS-SCCH physical channel capacity. The rest of the coding and multiplexing chain is unaffected by the additional HCSN bits.

2.5 UE Procedures

The UE procedure for the simple calculation of $E_\Delta$ and $N_\Delta$ need not be specified in 25.224 [2]. It is only required to informatively state that the HS-SCCH BLER may be inferred via appropriate use of HCSN.

The current UE procedure for derivation of HS-SCCH BLER [2] may be deleted.

2.6 Node-B Procedures

An obvious procedure that requires specification for the node-B is that the UE-specific HCSN must be incremented by 1 for each HS-SCCH transmitted.

Again, as for the UE, the HCSN is initialised to zero and may be reset to zero by higher layers.

The actual transmit power of the HS-SCCH remains entirely at the discretion of the node-B, and control algorithms are not specified.

3 CONCLUSION

TDD power control procedures for HS-SCCH cannot closely follow those that may be employed in FDD due to the timeslot-variant nature of the interference seen on downlink slots at the UE.

It is difficult to guarantee BLER performance for HS-SCCH with the current release 5 TDD specifications and this may have WG4 testing implications in addition to an HS-SCCH capacity degradation.

A scheme has been presented in this paper which it is felt represents the best way-forward. It is summarised by the following key points:—

1. A 2-bit HS-SCCH Cyclic Sequence Number (HCSN) is signalled to the UE in the HS-SCCH itself.
2. From this, the UE is able to correctly derive an accurate BLER estimate for HS-SCCH.
3. The additional power required on HS-SCCH to transmit the extra 2 bits of signalling is 0.17 dB for 1.28 Mcps TDD and 0.14 dB for 3.84 Mcps TDD.

The scheme has the following advantages:

1. An accurate estimate of HS-SCCH error statistics may be derived by the UE that does not rely on continuous scheduling of HS-SCCH or other scheduling constraints to achieve this.
2. Appropriate WG4 testing of HS-SCCH power control is enabled.
3. There is close to no additional power overhead required for the extra downlink signalling.
4. Only a minor change to the coding and multiplexing chain for HS-SCCH is required to implement the HCSN signalling.
5. The extensive capacity benefits resulting from accurate HS-SCCH power control are made available.
6. There is minimal impact on other working groups.

It is therefore proposed that this scheme be adopted by RAN 1 and the appropriate CR's to 25.222 and 25.224 accepted.

4 REFERENCES

[1] R1-02-0559 "Considerations on HS-SCCH Power Control", LGE, RAN WG1 #25, Paris, France, 9-12 Apr., 2002.
[2] 3GPP TS 25.224 v5.0.0 "Physical Layer Procedures (TDD) (Release 5)"
[3] R1-02-0409, "Power Control of HS-SCCH for TDD Release 5", IPWireless, RAN WG1 #24, Orlando, Fla., 18-22 Feb. 2002.
[4] R1-02-0633 "Options for Power Control of HS-SCCH for TDD Release 5", IPWireless, RAN WG1 #25, Paris, France, 9-12 Apr. 2002.
[5] R1-02-0293 "Power Control for HS-SCCH and HS-SICH for TDD", Siemens, RAN WG1 #24, Orlando, Fla., 18-22 Feb. 2002.
[6] 3GPP TS 25.222 v5.0.0, "Multiplexing and Channel Coding (TDD) Release 5)"

5 APPENDIX A-CR to 25.222 v5.0.0

6 APPENDIX B-CR to 25.224 v5.0.0

4.2.3.7 HS-SCCH

Higher layers shall indicate the initial transmit power of the HS-SCCH. How exactly this information is taken into account in the power setting is at the discretion of the Node-B.

Following the initial transmission, the NodeB may optionally power control the HS-SCCH. This may be done using TPC commands sent by the UE in the HS-SICH.

The TPC bits may be set by the UE based upon the measured HS-SCCH SIR in conjunction with an appropriate SIR target. The SIR target is set autonomously by the UE in order to attain the HS-SCCH target error rate as specified by higher layers. The accuracy of the received HS-SCCH error rate estimate made by the UE may be enhanced via a suitable use of the HCSN field received within the HS-SCCH itself [9].

The Node-B shall increment the UE-specific HCSN each time an HS-SCCH is transmitted to the UE. The initial HCSN used by the Node-B shall be set to zero and may additionally be reset to zero by higher layers.

The invention claimed is:

1. A communication system having communication power control, the system comprising:
   at a transmitter,
   means for holding a value representative of the number of transmissions intended for a predetermined receiver; and
   means for communicating the holding value; and
   at a receiver,
   means for holding the communicated holding value;
   means for holding an identification value associated with the last transmission successfully decoded at the receiver
   means for comparing the communicated holding value to the identification value to estimate signal reliability; and
   means for using the estimated signal reliability to effect transmission power control.

2. The communication system of claim 1, wherein the means for communicating the transmitter holding value comprises means for transmitting the transmitter holding value in a message to the receiver.

3. The communication system of claim 1, wherein the means for using the estimated signal reliability to effect transmission power control further comprises:
   means for estimating a signal quality;
   means for comparing the estimated signal quality to a signal quality target;
   means for effecting transmission power control based on the comparison of the estimated signal quality to the signal quality target; and
   means for adjusting the signal quality target based on the estimated signal reliability.

4. The communication system of claim 3, wherein the estimated signal quality is a signal-to interference ratio (SIR), and wherein the signal quality target is a SIR target.

5. The communication system of claim 1, wherein the means for using the estimated signal reliability to effect transmission power control comprises means for adjusting up/down commands of a transmitter power control.

6. The communication system of claim 1, wherein the transmissions are communicated on a high speed shared control channel.

7. The communication system of claim 1, wherein the system is a Universal Mobile Telecommunications System (UMTS) system.

8. The communication system of claim 7, wherein the system is a time division duplex (TDD) system.

9. The communication system of claim 1 wherein the transmitter comprises a Node B.

10. The communication system of claim 1 wherein the receiver comprises User Equipment.

11. The communication system of claim 1, wherein the means for using the estimated signal reliability to effect transmission power control further comprises:
   means for comparing the estimated signal reliability to a target signal reliability metric; and means for using the target signal reliability metric comparison to effect transmission power control.

12. The communication system of claim 1, wherein the estimated signal reliability is a message error rate.

13. The communication system of claim 1, wherein the identification value associated with the last transmission successfully decoded at the receiver is a sequence number.

14. A transmitter for use in a communication system having communication power control, the transmitter comprising:
means for holding a value representative of the number of transmissions intended for a predetermined receiver;
means for communicating the holding value to the receiver; and
means for adjusting transmission power control by power control commands communicated by the receiver,
wherein the power control commands are based upon the holding value.

15. The transmitter of claim 14, wherein the means for communicating the transmitter holding value comprises means for transmitting the transmitter holding value in a message to the receiver.

16. The transmitter of claim 14, wherein the transmissions are communicated on a high speed shared control channel.

17. The transmitter of claim 14, wherein the system is a Universal Mobile Telecommunications System (UMTS) system.

18. The transmitter of claim 17, wherein the system is a time division duplex (TDD) system.

19. The transmitter of claim 14 wherein the transmitter comprises a Node B.

20. An integrated circuit comprising the transmitter of claim 14.

21. The transmitter of claim 14, wherein the estimated signal reliability is a message error rate.

22. The transmitter of claim 14, wherein the identification value associated with the last transmission successfully decoded at the receiver is a sequence number.

23. A receiver for use in a communication system having communication power control, the receiver comprising:
means for holding an identification value associated with the last transmission successfully decoded;
means for receiving a holding value associated with a transmission representative of the number of transmissions intended for the receiver;
means for comparing the received holding value to the receiver identification value to estimate signal reliability;
means for using the estimated signal reliability to effect transmission power control.

24. The receiver of claim 23, wherein the means for using the estimated signal reliability to effect transmission power control further comprises:
means for estimating a signal quality;
means for comparing the estimated signal quality to a signal quality target;
means for effecting transmission power control based on the comparison of the estimated signal quality to the signal quality target; and
means for adjusting the signal quality target based on the estimated signal reliability.

25. The receiver of claim 24, wherein the estimated signal quality is a signal-to interference ratio (SIR), and wherein the signal quality target is a SIR target.

26. The receiver of claim 23, wherein the means for using the estimated signal reliability to effect transmission power control comprises means for adjusting up/down commands of a transmission power control.

27. The receiver of claim 16, wherein the transmissions are communicated on a high speed shared control channel.

28. The receiver of claim 23, wherein the system is a Universal Mobile Telecommunications System (UMTS) system.

29. The receiver of claim 28, wherein the system is a time division duplex (TDD) system.

30. The receiver of claim 23 wherein the receiver comprises User Equipment.

31. An integrated circuit comprising the receiver of claim 23.

32. The receiver of claim 23, wherein the means for using the estimated signal reliability to effect transmission power control farther comprises:
means for comparing the estimated signal reliability to a target signal reliability metric; and
means for using the target signal reliability metric comparison to effect transmission power control.

33. The receiver of claim 23, wherein the estimated signal reliability is a message error rate.

34. The receiver of claim 23, wherein the identification value associated with the last transmission successfully decoded is a sequence number.

35. A method for power control in a communication system, the method comprising:
storing a value representative of the number of transmissions intended for the receiver at a transmitter;
receiving the holding value from a transmitter;
holding an identification value associated with the last transmission successfully decoded at the receiver;
comparing the received holding value to the receiver identification value to estimate signal reliability; and
using the estimated signal reliability to effect transmission power control.

36. The method of claim 35, wherein receiving the transmitter holding value comprises receiving the transmitter holding value in a message to the receiver.

37. The method of claim 35, wherein using the estimated signal reliability to effect transmission power control further comprises:
estimating a signal quality;
comparing the estimated signal quality to a signal quality target;
effecting transmission power control based on the comparison of the estimated signal quality to the signal quality target; and
adjusting the signal quality target based on the estimated signal reliability.

38. The method of claim 37, wherein the estimated signal quality is a signal-to interference ratio (SIR), and wherein the signal quality target is a SIR target.

39. The method of claim 35, wherein using the estimated signal reliability to effect transmission power control comprises adjusting up/down commands of a transmission power control.

40. The method of claim 35, wherein the transmissions are received on a high speed shared control channel.

41. The method of claim 35, wherein the system is a Universal Mobile Telecommunications System (UMTS) system.

42. The method of claim 41, wherein the system is a time division duplex (TDD) system.

43. The method of claim 35 wherein the transmitter comprises a Node B.

44. The method of claim 35 wherein the receiver comprises User Equipment.

45. A computer-readable medium encoded with computer instructions for performing the method of power control in a communication system of claim 35.

46. The method of claim 35, wherein using the estimated signal reliability to effect transmission power control further comprises:
   comparing the estimated signal reliability to a target signal reliability metric; and
   using the target signal reliability metric comparison to effect transmission power control.

47. The method of claim 35, wherein the estimated signal reliability is a message error rate.

48. The method of claim 35, wherein the identification value associated with the last transmission successfully decoded is a sequence number.

* * * * *